Figure 1:
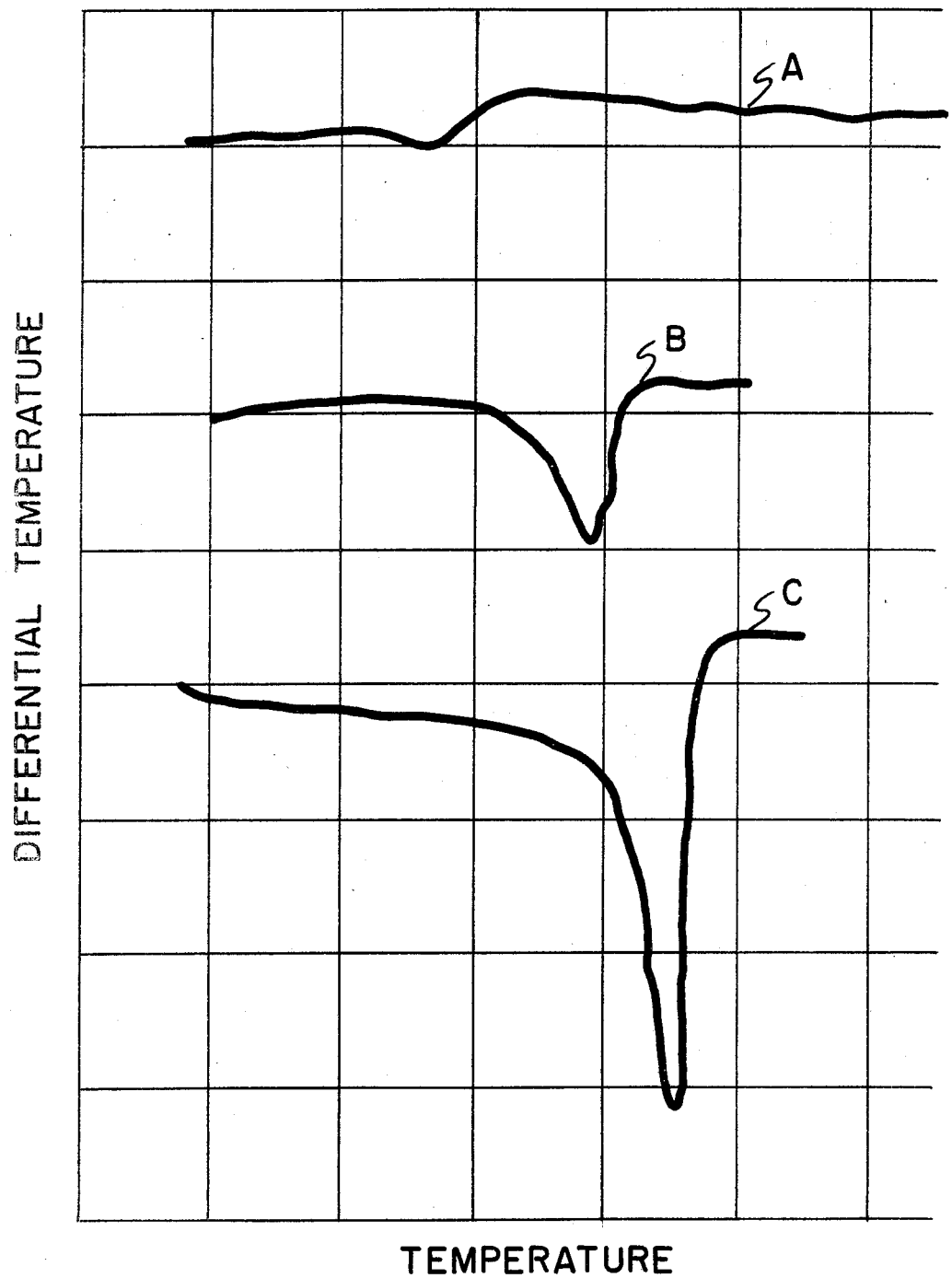

United States Patent Office 3,510,448
Patented May 5, 1970

3,510,448
ETHYLENE/ACRYLATE ESTER COPOLYMERS CONTAINING FILLERS
William H. Byler, Overland Park, and George E. Ham, Leawood, Kans., and Harry D. Anspon, Kansas City, Mo., assignors to Gulf Oil Corporation, Pittsburgh, Pa., a corporation of Pennsylvania
Continuation-in-part of application Ser. No. 50,882, Aug. 22, 1960. This application May 4, 1964, Ser. No. 364,541
Int. Cl. C08f 45/08, 45/04
U.S. Cl. 260—41       1 Claim This invention relates to ethylene copolymers and methods for their preparation. More particularly, it is concerned with filled ethylene-alkyl acrylic ester copolymers and their preparation.

This application is a continuation-in-part of our U.S. applications Ser. No. 165,451, filed Jan. 10, 1962, now abandoned and Ser. No. 335,732, filed Jan. 6, 1964, now U.S. Pat. 3,350,372 both of which in turn are continuation-in-parts of our U.S. application Ser. No. 50,882, filed Aug. 22, 1960, now abandoned.

It has been found according to the subject invention that copolymers of ethylene with an alkyl ester of an acrylic acid can be filled with a wide variety of fillers, especially inorganic fillers, with an increase in the beneficial properties of the copolymer and sometimes the achievement of additional characteristics which lend the products to important uses. It has also been found that such copolymers can be filled with varying amounts of fillers starting such as with the relatively low amount of 5% and extending as high as 80% based on the combined weight of copolymer and filler.

The copolymers used in such compositions comprise units corresponding to ethylene and an alkyl ester of an acrylic acid.

The copolymers as stated above contain alkyl acrylic ester groups. By alkyl acrylic ester for the purpose of this invention is meant an alkyl ester of an acrylic acid, as defined in Acrylic Resins, by Milton B. Horn, p. 15f., under the subtitle "Monomer Chemistry," whereunder alkyl esters of both unsubstituted acrylic acid

(CH$_2$=CH—COOH)

and simple alpha substituted acrylic acids such as those acrylic acids having a lower alkyl substituent, e.g., methacrylic acid

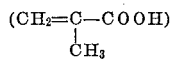
(CH$_2$=C—COOH)
  |
  CH$_3$ are included. Specific acrylic esters suitable for formation of the copolymers include such as the methyl, ethyl, propyl, isopropyl, butyl, isobutyl, hexyl, t-butyl, 2-ethylhexyl, decyl, lauryl, and stearyl esters of acrylic or methacrylic acids. It will be obvious to those skilled in the art that the alkyl portion of the alkyl acrylate may also have if desired certain simple substituents which do not substantially interfere with the formation of the copolymers nor detract from their desirable properties, without departure from the scope and spirit of this invention. Presently the preferred alkyl acrylic esters are the lower alkyl esters of simple acrylic acids, for example, methyl and butyl acrylates and methacrylates. The prior art shows some such copolymers, as for example see U.S. 2,200,429 and U.S. 2,953,551, disclosing copolymers having a very heterogeneous composition. When such prior art copolymers are fractionated by known techniques such as column elution techniques, it is observed that the fractions so recovered differ significantly from one another in the ration of polymerized monomers contained therein. Frequently, the acrylate ester content of an isolated fraction may differ by as much as 80% or more from the acrylate ester content of the whole copolymer. In some cases, fractions can be recovered which contain almost no polymerized acrylate ester.

However, the most suitable copolymers for use in the subject invention are unique and not shown in the art. These unique copolymers, as more particularly disclosed in our above identified parent application Ser. No. 335,732, whose teachings are incorporated herein by reference thereto, are highly uniform copolymers having excellent elastomeric properties. Generally, the term highly uniform is used with reference to the distribution of the alkyl acrylic ester groups among the polymeric chains. The polymers are elastomeric inasmuch as, in accordance with common usage, they have a rubber-like character demonstrated by a high degree of elastic recovery of the polymers when released from elongation. These polymers are normally solid, i.e., are solids under ambient room conditions.

For purposes of comparison, descriptions will now be given of techniques for distinguishing the foregoing novel copolymers from ethylene-acrylate ester copolymers prepared by prior art methods.

COMPARATIVE EXAMPLE I

Part A

To provide a sample of an ethylene-methyl acrylate copolymer typical of the copolymers previously known in the prior art, an ethylene-methyl acrylate copolymer is prepared following the procedure described in Example 9 of U.S. 2,200,429. The reactor employed is a 250 ml. Magne-Dash reactor. The ethylene employed contains 0.04% oxygen which functions as the polymerization initiator. Thirty mol of methyl acrylate is charged to the cool reactor and ethylene is then charged to build the pressure up to 10,000 p.s.i. The autoclave is then heated to 395° F. and polymerization is continued at this temperature for 20 hours. The average pressure obtained throughout the reaction is 28,000 p.s.i. The copolymer is recovered and contains 31 weight percent combined methyl acrylate.

Part B

Part A is repeated except that only 10 ml. of methyl acrylate is charged to the reactor and the reaction is stopped after 15 hours. The copolymer is recovered and contains 6 weight percent combined methyl acrylate.

Part C

Part B is repeated except for two changes that are made. First, only 5 ml. of methyl acrylate is charged to the reactor. Second, when the reaction 392° C. the reactor pressure has increased to only 17,500 p.s.i. At this point, additional ethylene is charged to the reactor to build the total pressure to 28,000 p.s.i. Polymerization is continued for 14 hours. The copolymer is recovered and contains 19.5 weight percent methyl acrylate.

Part D

Part C is repeated except that 7 ml. of methyl acrylate are initially charged into the reactor. The copolymer that is recovered contains 19.2 weight percent methyl acrylate.

Part E

Part C is repeated except that the methyl acryate is replaced with 10 ml. of methyl methacrylate and the reaction time is reduced to 12 hours. The copolymer obtained contains 8.7 weight percent combined methyl methacrylate.

The relative homogeneity of these prior art copolymers and the preferred novel copolymers, as prepared in the examples set out above, can be demonstrated by separating a whole copolymer into 10 percent weight fractions by a column elution technique essentially identical (except where otherwise specified) with that described by Francis, Cooke and Elliott (Journal of Polymer Science 31, 453 (1958)). The apparatus employed was that described by R. A. Mendelson, J. Polymer Science, Part A, vol. 1, pp. 2361–2369 (1963). The technique employed herein differs from that of Francis, Cooke and Elliott only in two important respects. First, in the present work, ethylene copolymers are fractionated whereas Francis et al. fractionated various polyethylene resins. Second, in the present work the elution is carried out at a temperature of 80° C. (maintained by jacketing the column with refluxing benzene).

The apparatus employed consists of a silica column affixed on top of a soxhlet device. As earlier noted, the silica column is jacketed so that it can be heated to 80° C. with refluxing benzene. Conventional accessory equipment is provided so that nitrogen pressure can be maintained within the soxhlet device so as to maintain (when desired) a fixed liquid level in the silica column.

In carrying out the separations, the column is first packed with 80–120 mesh silica and heated to 80° C. The silica column is then flooded with a 1:1 mixture of para-xylene (para-xylene is used throughout this work and all subsequent reference to xylene will be understood to refer to this specific isomer) and 2-ethoxyethanol. The xylene-2-ethoxyethanol mixture is then displaced from the silica column with hot xylene solution of the copolymer that is to be fractionated. When the level of the solution drops just below the top of the silica, nitrogen pressure is applied to the soxhlet device to maintain the polymer solution within the silica column. The xylene solution is then cooled to room temperature to precipitate the copolymer on the silica. The nitrogen pressure is released and the cold xylene is displaced from the column with cold ethoxyethanol. The ethoxyethanol is then held in the silica column by nitrogen pressure and heated to 80° C. The nitrogen pressure is then released and the copolymer is eluted with 18 successive aliquots of xylene-ethoxyethanol solvent mixture. The xylene content (in volume percent) of the aliquots is respectively 20, 30, 40, 45, 50, 53, 56, 58, 60, 62, 63, 64, 65, 66, 67, 68, 70 and 100.

Each of the aliquots that is collected is cooled to room temperature and mixed with 3 volumes of methanol to precipitate the copolymer. The recovery of the copolymer is substantially quantitative. The samples are combined (in the order collected) to give sample representing substantially 10 percent weight fractions of the copolymer sample originally precipitated on the silica. The combined samples are then analyzed for acrylate ester content.

In this manner a series of the preferred novel ethylene-methyl acrylate unloaded copolymers prepared by a method analogous to Example 1 set out below (see col. 10) and containing 20 weight percent methyl acrylate are fractionated by the column elution method above described. The first 10 percent weight fractions contain 20–23% methyl acrylate. The second 10 percent weight fractions contain 20–22% methyl acrylate. The third through the ninth 10 percent weight fractions contain 19–21% methyl acrylate. The tenth 10 percent weight fractions contain 18–20% methyl acrylate.

In a similar manner, a series of these novel ethylene-methyl acrylate copolymers prepared by a method analogous to Example 1 and containing, respectively, 15 weight percent and 25 weight percent methyl acrylate are fractionated. None of the recovered 10 percent weight fractions differ from the methyl acrylate content of the whole copolymer by more than ±20%. Invariably, the largest differences are observed in the first and the tenth percent weight fractions. The analyses of the third through the ninth fractions will, within the experimental error of analysis, be virtually identical with the methyl acrylate content of the whole copolymer.

In contrast to these results, when the prior art copolymers prepared in the comparative examples above are fractionated by the column elution technique, there are major differences in the acrylate ester content of the recovered fractions. In all cases, the first 10 percent weight fraction will have an acrylate ester content substantially greater than the acrylate ester content of the whole copolymer. The tenth 10 percent weight fraction in all cases will have an acrylate ester content substantially less than the whole copolymer. Moreover, with any of these copolymers, there is a constantly lower percent of acrylate ester content as one analyzes the second through the ninth 10 percent weight fraction. These results clearly establish that the prior art ethylene-acrylate ester copolymers are extremely heterogeneous in composition.

Differential thermal analysis of the copolymers of this invention and the ethylene-acrylate ester copolymers of the prior art can be used to establish differences in the structure of the two types of copolymers.

FIG. 1 shows a DTA Curve (identified as Curve A) for a typical novel ethylene-methyl acrylate copolymer (containing 20% methyl acrylate) described herein as compared to a DTA Curve of an ethylene-methyl acrylate copolymer prepared by Part C of Comparative Example I (identified as Curve B) and a DTA Curve of polyethylene (identified as Curve C) produced by a high pressure autoclave process analogous to that employed in preparing the copolymers of the invention. The procedure and apparatus employed to obtain the curves is described in the chapter beginning on p. 361 in Organic Analysis, vol. 4, published by Interscience Publishers, Inc. (1960); this chapter, written by Bacon Ke, is entitled "Application of Differential Thermal Analysis to High Polymers." In obtaining the curves illustrated, the temperature was raised at a rate of 2.4° C. per minute over a temperature range of 50–170° C.

Curve C contains a very marked discontinuity which illustrates that a first order (melting) transition is taking place. This first order transition represents melting of the crystalline phase of polyethylene. Curve B exhibits a similar discontinuity typical of a first order transition, although not as marked as Curve C. The most probable explanation of this discontinuity is that the prior art ethylene-methyl acrylate copolymer contains polymer chains having a substantial number of polymerized ethylene units linked together which are capable of crystallizing in a manner analogous to polyethylene. The very minor discontinuity in Curve A is indicative only of a second order transition without any indication of a first order transition. The most logical interpretation of this curve is that this novel ethylene-methyl acrylate copolymer does not contain polymer chains having a sufficient number of uninterrupted polymerized ethylene units to crystallize in a manner analogous to polyethylene. This evidence shows that, in these novel copolymers, the polymerized methyl acrylate groups are distributed substantially uniformly throughout all of the polymer chains.

The characterization of the structure of the novel ethylene-acrylate ester copolymer by differential thermal analysis is most clearly shown with copolymers containing at least 5 mol percent of the acrylate ester. When a smaller quantity of the acrylate ester is present, a sufficient number of polymerized ethylene units can be linked together to provide a small, but measurable first order transition in the uniform copolymers of the invention.

The novel ethylene-acrylate ester copolymers also can be distinguished from the ethylene-acrylate ester copolymers of the prior art by measuring their resistance to environmental stress-cracking as determined by the method described in ASTM–D–1693–60T. As noted in the examples below, when these novel copolymers are tested under the most vigorous conditions permitted by this ASTM method, there is seldom any failure among 15 parts tested over a 5-day period. By way of distinct contrast, when the prior art copolymers illustrated in the comparative example are tested by this same method, usually at least 50% of the tested parts will fail within 24 hours.

Thermal degradation of ethylene-acrylate ester copolymers also can be used to distinguish the novel copolymers described herein from the ethylene-acrylate ester copolymers of the prior art. More specifically, when the copolymers are thermally degraded as described by Karl J. Bombaugh, C. E. Cook and B. H. Clampitt, "Investigation of Copolymer Distribution in Ethylene-Acrylate Copolymers with Thermal Methods," Analytical Chemistry, 35, No. 12, p. 1834 (1963), the Major Pyrolyzate Index (as therein defined) can be used to distinguish uniform ethylene-acrylate ester copolymers from the non-uniform ethylene-acrylate ester copolymers of the prior art.

The Major Pyrolyzate Indexes (MPI), defined by Bombaugh et al., supra, of a series of the herein described novel ethylene-methyl acrylate copolymers are determined and plotted against the weight percent of methyl acrylate contained in the copolymers. This curve is identified as Curve A in FIG. 2. The best plot of the experimental data, over a range of 10–30% methyl acrylate content, can be represented by the formula:

(A) MPI=0.8 (wt. percent methyl acrylate)−6

It has been empirically observed that the Major Pyrolyzate Index of these novel copolymers can be defined by the following formula:

(B) MPI=[0.8 (wt. percent methyl acrylate) −6]±3

Figure 2:
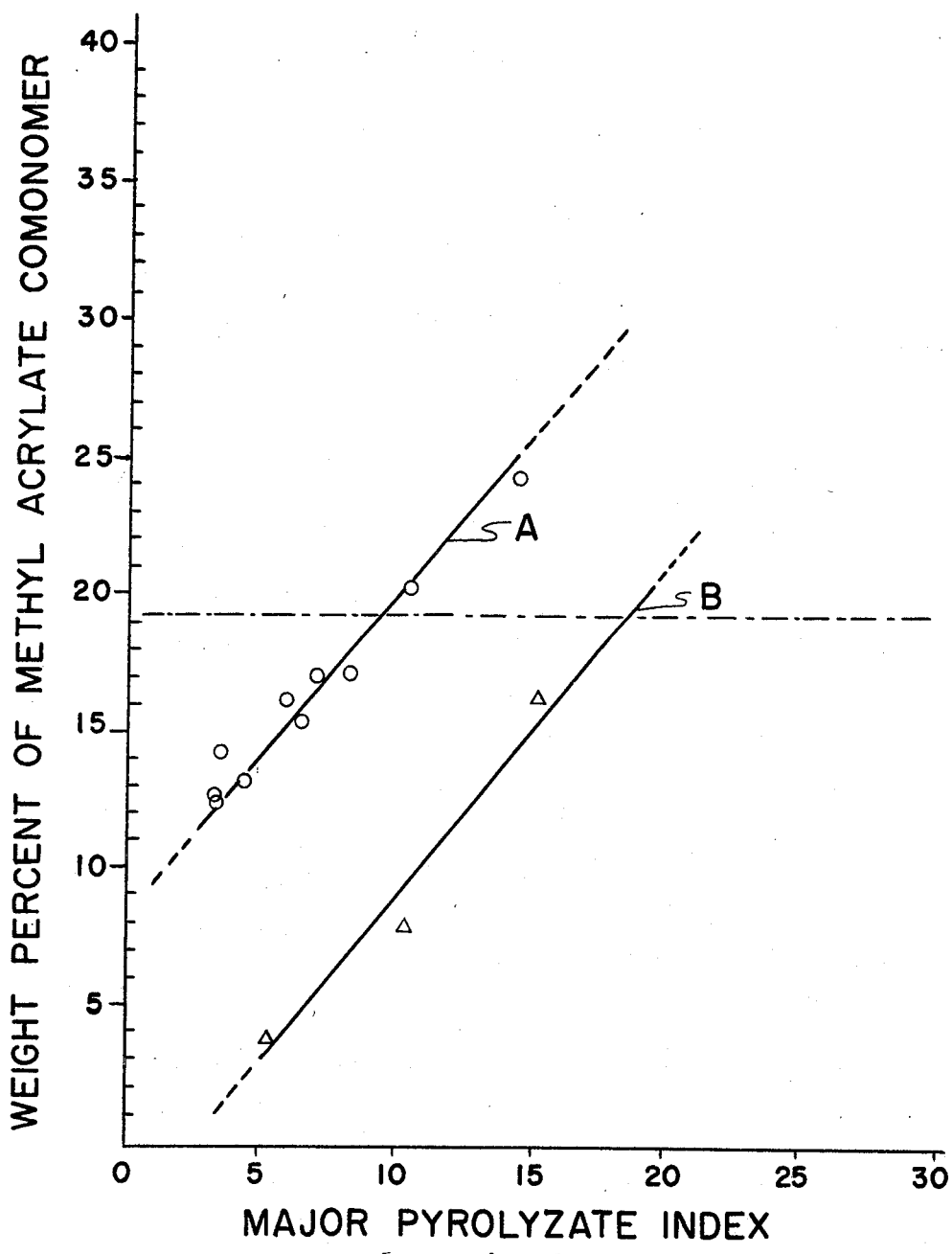

Also shown in FIG. 2 is Curve B which is a plot of Major Pyrolyzate Index vs. weight percent of methyl acrylate in blends of ethylene homopolymers with methyl acrylate homopolymers. It is apparent from a mere inspection of the two curves that there are major differences in the thermal degradation profiles of the novel copolymer as compared with a mixture of homopolymers of the two monomer species. When the prior art copolymers of Parts A, C and D of the comparative example are subjected to thermal degradation, they have Major Pyrolyzate Indexes which fall either on or close to Curve B and fall outside of the value that would be calculated by Formula B above.

The method can be used to distinguish between uniform and heterogeneous ethylene copolymers of higher esters of acrylic acid, but with these copolymers it may be necessary to first convert the acrylate ester moiety to methyl ester by an ester interchange reaction.

These novel preferred unique copolymers can be prepared by a continuous polymerization process in which ethylene, an acrylate ester and a free radical polymerization initiator are continuously introduced into a polymerization zone at a uniform rate while unpolymerized ethylene, unpolymerized acrylate ester and ethylene-acrylate ester copolymer are being continuously withdrawn from the polymerization zone at a uniform rate. The rates of monomer introduction and product withdrawal are set to be substantially identical so that the process is operated under equilibrium conditions. The reaction is carried out under conditions such that a uniform concentration of unreacted acrylate ester is maintained throughout the entire polymerization zone.

The ethylene-acrylate ester copolymers so obtained are highly uniform in composition and have the polymerized ethylene groups and the polymerized acrylate ester groups randomly distributed throughout the copolymer chains. "Highly uniform" as used herein more specifically means that when the copolymer is separated into ten percent weight fractions by a column elution technique as described in J. Polymer Science 31, 453 (1958)) it will contain no ten percent weight fraction which differs in polymerized acrylate ester monomer content by more than about 40% from the polymerized acrylate ester content of the whole copolymer. By way of specific example, when the copolymer contains 90% polymerized ethylene and 10% polymerized acrylate ester, each ten percent weight fraction of the copolymer will contain from 6 to 14 percent of polymerized acrylate ester. In most cases, the polymerized acrylate ester content of the ten percent weight fractions of the copolymer will differ from the polymerized acrylate ester content of the whole copolymer by less than 20% and in many by less than 10%. The ethylene-acrylate ester copolymers are further characterized, when containing at least 5 mol percent of acrylate ester, by being essentially amorphous and not exhibiting a first order transition when subjected to differential thermal analysis over the temperature range of about 50–170° C. As noted above, these ethylene-acrylate ester copolymers also have a lower Major Pyrolyzate Index (subsequently described) than does a mixture of an ethylene homopolymer and an acrylate ester homopolymer having the same percentage of polymerized monomers. The method of determining Major Pyrolyzate Index and its significance in characterizing the copolymers of the invention has been discussed above.

The foregoing and other similar novel ethylene-acrylate ester copolymers are ordinarily prepared in a manner analogous to that employed in the preparation of ethylene homopolymers, except that the ethylene monomer and the acrylate ester monomer are introduced into the reaction in a constant molar ratio and reactants are discharged from the reactor at the same rate that the monomers are charged to the reactor. The rate of introduction of acrylate ester monomer, the rate of polymerization (which is influenced principally by catalyst type, catalyst concentration, reactor pressure, and reaction temperature), and the residence time of the reactants in the reactor are all controlled so that a substantially uniform concentration of unpolymerized acrylate is continuously maintained throughout the entire reaction medium. Typically, the polymerization will be carried out in a high-pressure stirred autoclave with effective stirring being provided so that the acrylate ester is uniformly distributed throughout the entire reaction zone.

Alternatively, the reaction can be carried out in a tubular reactor. As stirring cannot be provided in a tubular reactor, the acrylate ester should be introduced to the reactor in a number of separate streams provided along the length of the tubes so that the concentration of the acrylate ester will be maintained at a substantially constant level throughout the entire reaction zone. This acrylate ester feeding procedure is required as the acrylate ester is consumed in the reaction at a faster rate than the ethylene. The location of the acrylate ester feed inlets and the rates of introduction to be used at each inlet can be easily established from a knowledge of the rates of reaction of the monomers under the polymerization conditions employed. Alternatively, sample streams can be taken off of the tubular reactor at various points so that the monomer concentrations at any section can be determined by analysis, e.g., by gas chromatography, which analytical data then can be used to make any necessary adjustments in the feed streams.

Typically, the copolymerizations will be run at pressures usually maintained in the range of about 10,000 to about 40,000 p.s.i. The pressure is desirably maintained in the range of about 12,000 to 30,000 p.s.i. with a presently preferred range being from about 15,000 to about 23,000 p.s.i. The temperature suitably is maintained above about 200° F. and below the decomposition point of ethylene. It will be understood that the exact temperature employed depends upon such factors as the particular intiator used, type of reactor, and the like. However, usually a temperature range for the reaction is desirable which extends from about 200 to about 600° F. with a preferable range being about 300 to about 500° F.

It is desirable to carry out the reaction in substantial absence of added solvent taking into consideration that a nominal amount of solvent often is necessary or desirable such as to function as a carrier in the introduction of the initiator, to act as a telogen, and the like. The term "added solvent" is exclusive of the ethylene and acrylic ester reactants.

The catalyst employed in the polymerization is preferably of the free radical type, e.g., one of those effective ones which are presently known or available. Representative of suitable catalysts employable in the production of the copolymers include organic peroxides used in its broader meaning and including such typical compounds as lauroyl peroxide, ditertiary butyl peroxide, caprylyl peroxide, tertiary butyl perbenzoate, and tertiary butyl peracetate. Suitable catalysts also include the azo type initiators such as alpha,alpha'-azobisisobutonitrile, alpha,alpha'-azobisethylpropionate and alpha,alpha'-azobisethylisobutyrate. Although the control of the polymerization customarily is more difficult with the use of oxygen as initiator, it can be so used. If the initiator is of a solid type, it can be injected into the reactor using a vehicle compatible with the initiator as well as with the polymerization process. Benzene and mineral oil or other suitable solvents and comibnations can be employed as the carrier. About 50 to 20,000 p.p.m., and generally about 100 to 250 p.p.m. of initiator in the reaction mixture, based on the ethylene weight and depending upon the specific initiator and the temperature desired, are usually adequate.

The ethylene employed will be of the grade employed in the homopolymerization of ethylene. The acrylate ester employed may be a polymerization grade that has been freed of inhibitors and has an oxygen content of less than about 20 p.p.m. It has been observed that acrylate esters can be easily freed of dissolved oxygen by flushing the acrylate ester with ethylene gas.

It is desirable to employ a feed of ethylene containing no acrylate in commencement of a run, and, then, after the reactor has been initiated ("lighted") and has reached an equilibrium, to advert gradually to the desired ethylene-alkyl acrylic ester feed. This insures a substantially uniform mixture of the comonomers when they enter the reaction zone of the reactor. The reactants can also be introduced by means of a common inlet as a mixture. The flow rate of the reaction feed must necessarily be adjusted to the particular reactor employed with its diameter, length, ratios thereof, and other design specifics, the desired content of the respective comonomers in the end polymer, the initiator used, and other considerations.

The produced molten polymer is collected in the customary manner on discharge from the reactor employing pressure let-down valve devices and the like and is extruded for example as a molten ribbon into a coolant such as a water bath. The cooled, solidified ribbon of ethylene-alkyl acrylic ester copolymer then is removed from the bath as by a conveyor and is cubed or severed into other convenient shapes for utilization.

The handling of such purified acrylate ester monomer at elevated temperatures and pressures may pose problems in polymerizing in the pumps and lines leading to the reactor. As an alternative procedure, a small quantity of an inhibitor (e.g., the methyl ether of hydroquinone) and/or oxygen may be added to the acrylate ester to prevent such premature polymerization. Such a procedure requires slight modifications in the polymerization zone. First, a slight increase may be required in the quantity of initiator charged to the reactor. Second, any oxygen introduced with the acrylate ester can act as a polymerization initiator. To prevent such oxygen from influencing the rate of polymerization, it may be desirable to charge to the polymerization, it may be desirable to charge to the polymerization zone a small quantity of an oxygen scavenger such as 2,6-ditertiarybutyl-4-methylphenol.

The acrylate ester employed for this invention will conform with the formula:

$$CH_2=\underset{\underset{X}{|}}{C}-\underset{\underset{O}{\|}}{C}-O-R$$

wherein X is selected from the group consisting of hydrogen and a methyl group and R is an alkyl group containing 1–22 atoms. Typical examples of suitable acrylate esters include methyl acrylate, butyl acrylate, 2-ethylhexyl acrylate, decyl acrylate, octadecyl acrylate and the corresponding esters of methacrylic acid.

The acrylate esters that are preferred for employment in the present invention are those in which the alcohol moiety of the acrylate ester is derived from a 1–4 carbon alkanol. It also has been observed that copolymers containing a methacrylate ester, as compared with copolymers containing a corresponding acrylate ester, have greater clarity and greater impact strength.

As earlier noted, the acrylate ester is consumed in the copolymerization reaction at a faster rate (relative to the ratio of the weights of monomers being charged) than the ethylene. It therefore follows that the acrylate ester must necessarily be charged to the polymerization reaction in a lower molar ratio than is desired in the final copolymer. Ordinarily, the acrylate ester will be charged at a ratio not greater than 0.035 mol per mol of ethylene and customarily will be charged in a ratio of 0.0006–0.020 mol per mol of ethylene or, more especially, in a ratio of 0.001 to 0.015 mol per mol of ethylene.

Although it is possible to prepare uniform ethylene-acrylate ester copolymers over a wide range of molar ratios of combined ethylene and acrylate ester, the preferred copolymers of the invention ordinarily will contain a minimum of 0.5 mol of acrylate ester per mol of ethylene, i.e., 33 mol percent acrylate ester. The copolymer ordinarily contain at least 1 mol percent of the acrylate ester and preferably will contain 0.25–0.20 and more especially 0.05 to 0.15 mol of acrylate ester per mol of ethylene.

It has been found with surprise that such copolymers, including those of the prior art, retain a high degree of elasticity and flexibility as well as many of the other advantageous properties when highly filled with a variety of fillers to the extent, on the basis of one hundred parts of filled copolymer, of from about five to fifty parts of filler and at times up to about eightly parts of filler, with a preferred range on the order of 10–50% of the total composition. Accordingly, it is to be understood that both, the novel preferred embodiments of the foregoing copolymers and those of the prior art, are amenable to this invention. That the copolymers can be filled to such a high extent is surprising. Aluminum oxide, asbestos, carbon black, CaO, $SiO_2$, ZnO, MgO, $TiO_2$, clay, calcium carbonate, barium sulfate and the like are illustrative fillers. Preferred fillers presently are the carbon black and metallic oxide fillers. Filler substances of the finely divided character are selected.

The compositions filled with carbon, as for example acetylene black, are particularly useful as semi-conducting materials to be placed between conductors and insulation. The semi-conducting material prevents the formation of corona in the event air spaces or voids are present between the conductor and the dielectric. The carbon filled copolymers can be extruded around electrical wire and cable and then a nonconducting insulation placed thereover. Filled copolymers containing 20 to 40% by weight of carbon are particularly useful for this purpose. Any suitable form of carbon can be used, including acetylene black or an oil furnace black, which is semiconductive.

Loading of the above described novel copolymers in accordance with this invention provide particular advantages in that they retain their excellent physical properties even when loaded with large volumes of inert inorganic fillers. For example, when these novel copolymers are loaded, in accordance with this invention, with 30–150 parts of iron oxide per 100 parts of copolymer, there is obtained an excellent gasket material which is magnetically susceptible and can be used in the fabrication of gaskets for refrigerator door liners that are to be sealed by magnets placed within the refrigerator panels adjacent to the gasket material. In a somewhat similar manner, the above noted copolymers that are loaded with 20–65%, preferably 30–40% (based on the total composition) of carbon black have remarkably good physical properties, even at temperatures as low as −50° C. or even lower.

Likewise, loading of the foregoing copolymers with lead or lead or of from about 20% to 80%, and even up to 85% by weight provided mixes adaptable for use with conventional extruders and molders which can process them into sheets, films and/or shapes, i.e., lead pipe or other continuous shapes such as door molding or gaskets. The film embodiment is of particular value for coating substrates of various plastics, wood and metals for purposes of weather proofing, corrosion resistance, sound attenuation and the like. The lead used in loading these copolymers may be either standard lead of 20 microns average or superfine lead of 3 microns average having a 99.825 lead analysis. Similarly, the lead ore employed may comprise conventional galena ore having a 75% lead assay with the remaining constituents comprised principally of zinc and iron.

Typically, using ethylene-methyl acrylate copolymer having a melt index 6.0 and of 23% acrylate, a filled weight percent of lead powder or lead or can be accomplished up to 79% with very little change in stiffness, vicat softening, hardness, or melt index. Beyond 79%, the properties change very rapidly but, however, are still in the range of thermoplastic at 89% by weight lead. Loadings above 89% would be difficult to handle or use.

The copolymer and filler can be admixed in numerous ways resulting in thorough admixture. Any standard mixing equipment can be used, such as roll mills, Banbury mixers, sigma blade mixers, mixing screws, plastruders and rubber mills.

Typically a charge of the foregoing ethylene-methyl acrylate (of M.I. 6.0 and 23% acrylate) was premelted on a roll mill at about 250° F., and a charge of lead or lead ore was then added and mixed for about 2 minutes, followed by sheeting off the mill and pressing into plates and films by compression molding (325° F.–20 tons). In this manner, galena, concentrated ore, was admixed with the copolymer in 20%, 33%, 50%, 67%, 80%, 83%, and 89% concentrations. The consistencies of the melts showed that the resultant admixtures in concentrations up to 75%–80% filler could be extruded continuously into thin sheets or films of 1, 5, 50, 100 and 250 mils by conventional equipment.

Additives can be incorporated into the copolymers, if desired. Such additives as coloring agents, stabilizers, lubricants, brighteners, ultraviolet desensitizers, antiblock agents, and the like can be employed. At times, for example, it is desirable to incorporate in admixtures ultraviolet desensitizers, for example carbon black preparations, at the relatively small percentages. The selection and the procedure of incorporation of such additives can be conducted in accordance with the principles and procedures well within the knowledge and skill of the polymer art.

The filled copolymer preparations of this invention have a wide degree of usefulness. The filled polymers can be employed as elastomers in plastics having a need for increased elastomeric properties, for example, certain polyethylene and polypropylene plastics. The filled copolymers can be formed into films useful in a variety of needs especially in view of the unusually high drape and the elastomeric nature of the films without plasticizers, e.g., film wrap, garment covers, table cloths, gloves, et cetera. In addition, the copolymers can be employed in the molding field such as in the molding of toys, and a variety of other objects, by injection or by compression molding where such desired products advantageously possess a high elastomeric or flexible character.

The following examples are provided to further illustrate the copolymers comprehended within this invention and their loading in accordance with this invention.

EXAMPLE 1

Preparation of ethylene-methyl acrylate copolymer

After preliminarily lighting a reactor using an ethylene feed and attaining reactor equilibrium, the desired reaction is commenced by gradually adverting to the required reaction feed. The reactants are continuously fed by pumping into the fore part of the reaction zone of a high pressure, agitated autoclave reactor at a ratio of two parts of methyl acrylate to ninety-eight parts of ethylene by weight and at a rate of about 500 lb./hr./cu. ft. of reactor volume. The reaction feed employed has low moisture and oxygen contents. Lauroyl peroxide is injected as the free radical initiator in an equivolume benzene-mineral oil vehicle at a rate of 750 p.p.m. on the basis of the weight of feed. The reaction is conducted at a pressure of about 17,500 p.s.i. The temperature is maintained in the range of 300° F. to about 430° F., for the most part controlled at around 360° F. The reactor is equipped with a longitudinal agitator which is rotated at a rate of about 1250 r.p.m.

The unconsumed reactants, along with the formed copolymer, are discharged from the reactor in a conversion to the copolymer of from 15 to 20% of the total weight of the reactants. Nearly all of the unpolymerized discharge of reactants constitutes ethylene. It is recovered from the molten copolymer by means of separator vessels and circulated for re-use.

The separated molten polymer is then extruded as a ribbon into a water bath for cooling. The solidified copolymer of ethylene and methyl acrylate is severed into cubes for convenient end use.

The copolymer has the following properties: a content of 0.054 mol of methyl acrylate/mol of ethylene of the polymer as determined by infrared absorption analysis, a melt index of 1.72, a density of 0.9365, and a Vicat softening point of 71° C.

Additionally, the copolymer has an ultimate elongation value of 690%. In a cold temperature brittleness test, standard parts formed of the copolymer showed no failures among fifteen test parts at −72° C. In respect to stress crack, standard parts formed of the copolymer showed no failures in five days. The copolymer shows a film impact value of 2560 p.s.i., a yield point of 492 p.s.i., and an ultimate tensile strength of 1380 p.s.i. Film cast of the copolymer is highly elastomeric. The polymer shows strong adhesion to aluminum foil.

Filled copolymer containing thirty percent by weight of $TiO_2$, CaO, carbon black, MgO, calcium carbonate, or ZnO retains high elongation and tensile properties. Such fillers can be incorporated readily in such copolymer in small amounts such as 5% and with some fillers up to 80% based on the combined weight of copolymer and filler. The usual range however is about 20 to 50% of filler in the filled copolymer.

EXAMPLE 2

Preparation of an ethylene-methyl methacrylate copolymer

Following the procedure of Example 1, an ethylene-methyl methacrylate copolymer is prepared employing the following conditions: Feed constitutes two parts of methyl methacrylate and ninety-eight parts of ethylene by weight, reactor temperature maintained in the range of 240° F. to 340° F. and for the most part controlled at around 335° F., the reactor pressure maintained at about 22,500 p.s.i. and about 440 p.p.m. on the basis of feed weight of caprylyl peroxide employed as initiator.

The provided ethylene-methyl methacrylate copolymer has a content of 0.016 mol of methyl methacrylate/mol of ethylene of the polymer, as determined by infrared analysis, has a melt index of 0.55, has a density of 0.9274, and has a Vicat softening point of 70.5° C.

Additionally, the copolymer has an ultimate elongation value of 700%. In the above described cold temperature brittleness tests, standard parts formed of the copolymer showed one failure among ten test parts at −72° C. The copolymer shows a film impact value of 3280 p.s.i., a yield point of 720 p.s.i., and an ultimate tensile strength of 1590. Film cast of the copolymer is highly elastomeric. This copolymer is filled with 40% by weight of carbon black based on the filled copolymer. Other fillers such as calcium oxide, titanium dioxide, magnesium oxide, aluminum oxide and other fillers can be readily incorporated in this copolymer by conventional methods.

EXAMPLE 3

Preparation of an ethylene-butyl methacrylate copolymer

Following the procedure of Example 1, an ethylene-butyl methacrylate copolymer is prepared employing the following conditions: Feed constitutes three parts of butyl methacrylate and ninety-seven parts of ethylene, reactor temperature maintained in the range of 300° F. to 350° F. and for the most part controlled at around 330° F., the reactor pressure maintained at about 21,000 p.s.i., and about 400 p.p.m. on the basis of feed weight of caprylyl peroxide employed an initiator.

The provided ethylene-butyl methacrylate copolymer has a content of 0.018 mol of butyl methacrylate/mol of ethylene of the copolymer, as determined by infrared analysis, has a melt index of 4.45, has a density of 0.9219, and a Vicat softening point of 52° C.

Additionally, the copolymer has an ultimate elongation value of 540%. The copolymer shows a yield point of 720 p.s.i., and an ultimate tensile strength of 755 p.s.i. Film cast of the copolymer is highly elastomeric.

This copolymer is filled with carbon black in the range of 20 to 50% by weight based on the filled copolymer, using conventional techniques for effecting the filling, and the filled copolymer has excellent properties.

EXAMPLE 4

Preparation of an ethylene-butyl acrylate copolymer

Following the procedure of Example 1, an ethylene-butyl acrylate copolymer is prepared employing the following conditions: Feed constitutes 1.4 parts of butyl acrylate and 98.6 parts of ethylene by weight, reactor temperature maintained in the range of 300° F. to 350° F. and for the most part controlled at around 324° F., the reactor pressure maintained at about 18,000 p.s.i., and about 300 p.p.m. on the basis of feed weight of caprylyl peroxide employed as initiator.

The provided ethylene-butyl acrylate coplymer has a content of 0.009 mol of butyl acrylate/mol of ethylene of the polymers as determined by infrared analysis, has a melt index of 2.87, has a density of 0.9210, and a Vicat softening point of 75.8° C.

Additionally, the copolymer has a ultimate elongation value of 675%. In the above described cold temperature brittleness test, standard parts formed of the copolymer showed no failure among ten test parts at −72° C. In respect to the stress crack tests described hereinabove, the standard parts formed in the copolymer showed no failure in eight days. The copolymer shows a film impact value of 1830 p.s.i., a yield point of 630 p.s.i., and an ultimate tensile strength of 1275 p.s.i. Film cast of the copolymer is again characterized by high elasticity.

This polymer is filled with carbon black to 35% by weight based on the weight of the filled copolymer.

EXAMPLE 5

Preparation of an ethylene-stearyl methacrylate copolymer

Following the procedure of Example 1, an ethylene-stearyl methacrylate copolymer is prepared employing the following conditions: Feed constitutes one part of stearyl methacrylate and ninety-nine parts of ethylene by weight, reactor temperature is controlled at around 270° F., the reactor pressure is maintained at about 16,500 p.s.i., and caprylyl peroxide is employed as the initiator.

The provided ethylene-stearyl methacrylate copolymer is characterized by having an alkyl acrylate content of 0.016 mol per mol of ethylene of the copolymer as determined by infrared analysis, a melt index of 2.23, a density of 0.9199, a Vicat softening point of 85.8° C., a film impact value of 3160 p.s.i, and ultimate elongation value of 580%, and ultimate tensile strength of 1200 p.s.i. In the cold temperature brittleness test, the copolymer showed no failure among ten test parts at −72° C.

This copolymer is filled to 20% with titanium dioxide. It can also be filled to 20–40% with carbon black based on the weight of the filled copolymer.

EXAMPLE 6

Preparation of ethylene-2-ethylhexyl methacrylate copolymer

Following the procedure of Example 1, an ethylene-2-ethylhexyl methacrylate copolymer is prepared employing the following conditions: Feed consitutes 2.75 parts of 2500 p.s.i., an ultimate elongation value of 760%. by weight, reactor temperature is controlled at about 330° F., the reactor pressure is maintained at about 19,250 p.s.i., and caprylyl peroxide is employed as the initiator.

The provided ethylene-2-ethylhexyl methacrylate copolymer is characterized by having an alkyl acrylate content of 0.014 mol per mol of ethylene of the copolymer, as determined by infrared analysis, a melt index of 0.07, a Vicat melting point of 80° C., and a film impact value of 2500 p.s.i., an ultimate elongation value of 760%. There were no failures among ten specimens tested at −72° C. in the cold temperature brittleness test. The coplymer is elastomeric and compatible with polypropylene.

This copolymer is filled with 30% by weight of carbon black based on the weight of the filled copolymer.

Ethylene-stearyl acrylate and ethylene-2-ethyl-hexyl acrylate copolymers corresponding to the above methacrylate copolymers and the ethylene-lauryl acrylate copolymer can also be prepared by following the above procedures and employing the required alkyl acrylate. These copolymers are also readily filled with carbon black, magnesium oxide, titanium dioxide, calcium carbonate and other such inorganic fillers, particularly metallic oxides, in the range of 20–50% by weight based on the filled copolymers.

Various changes and modifications of the invention can be made and, to the extent that such variations incorporate the spirit of this invention, they are intended to be included within the scope of the appended claim.

What is claimed is:

1. A composition consisting essentially of a copolymer of ethylene and ethyl acrylate, and carbon black in an amount of from about 30 percent by weight to about 50 percent by weight based on the weight of said copolymer and said carbon black.

References Cited

UNITED STATES PATENTS

| | | | |
|---|---|---|---|
| 2,934,510 | 4/1960 | Crissey et al. | 260—41 |
| 2,953,551 | 9/1960 | White | 260—86.7 |
| 2,200,429 | 5/1940 | Perrin et al. | 260—85.3 |
| 2,316,418 | 4/1943 | Habgood | 260—41 |
| 3,184,807 | 5/1965 | Schornstheimer et al. | 252—62.54 |
| 3,350,372 | 10/1967 | Anspon et al. | 260—86.7 |

(Other references on following page)

FOREIGN PATENTS 900,969    7/1962    Great Britain.

OTHER REFERENCES

Delmonte, Metal-Filled Plastics, Reinhold Publishing Corporation, New York, 1961, pp. 78, 101–103, 149, 150, 163.

Product Engineering, Jan. 9, 1961, pp. 65–68.

Simonds et al., Handbook of Plastics, D. Van Nostrand Co., Inc., 1949, pp. 309 and 310.

MORRIS LIEBMAN, Primary Examiner

J. H. DERRINGTON, Assistant Examiner

U.S. Cl. X.R.

252—62.54, 511

UNITED STATES PATENT OFFICE
CERTIFICATE OF CORRECTION

Patent No. 3,510,448　　　　　　　　　　Dated May 5, 1970

Inventor(s)　William H. Byler et al.

It is certified that error appears in the above-identified patent and that said Letters Patent are hereby corrected as shown below:

Column 2, line 51, after "reaction" insert -- temperature has reached --. Column 7, line 71, cancel "it may be desirable to charge to the polymerization"; Column 8, that portion of the formula at the top of the column reading

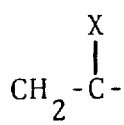　　　should read　　　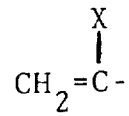

Column 9, lines 10 and 27, "or lead or", each occurrence, should read -- of lead ore --. Column 12, line 26, "of 2500 p.s.i., an ultimate elongation value of 760%" should read -- of 2-ethylhexyl methacrylate and 97.25 part of ethylene --.

Signed and sealed this 19th day of October 1971.

(SEAL)
Attest:

EDWARD M. FLETCHER, JR.　　　　　　ROBERT GOTTSCHALK
Attesting Officer　　　　　　　　　　Acting Commissioner of Patents